UNITED STATES PATENT OFFICE.

MAX WALLERSTEIN, OF NEW YORK, N. Y.

PROCESS OF MAKING FERMENTED BEVERAGES.

No. 905,029.    Specification of Letters Patent.    Patented Nov. 24, 1908.

Application filed March 26, 1908. Serial No. 423,381.

*To all whom it may concern:*

Be it known that I, MAX WALLERSTEIN, a citizen of the United States, residing at New York, in the county of New York and State of New York, have invented certain new and useful Improvements in Processes of Making Fermented Beverages, of which the following is a specification.

This invention relates to processes whereby starch or starchy materials, as for instance mashes of distilleries and breweries, are converted and saccharified by means of malt.

It has been recognized heretofore that calcium sulfate existing in small proportions in the waters used for brewing or added thereto exerts a favorable action upon the brewing operation and upon the character of the final product. I have now established the fact that when used in sufficient proportions as hereinafter described, this salt possesses the property of greatly enhancing the liquefying power of malt and greatly increasing its saccharifying power. By liquefying power is meant the action of diastase on starch which takes place at comparatively high temperatures and which changes the starch into soluble starch. By saccharifying power is meant the action of malt or diastasic solutions in effecting the conversion and saccharification of the liquefied or modified starch.

I have also discovered that when calcium sulfate is present in sufficient proportions in the medium to be saccharified, the diastase is capable of effecting saccharification at temperatures at which it would otherwise possess little or no activity and would even be destroyed and coagulated; and that the worts thus obtained are quite liquid and comparatively rich in dextrines.

The above statements are readily demonstrated by the following tests:—(1) Thirty grams of starch are mixed with 1,000 cc. of distilled water and boiled for one hour. (2) One gram of calcium sulfate is dissolved in 1,000 cc. of distilled water, thirty grams of starch are added, and the mixture is also boiled for one hour. Both mixtures (1) and (2) are cooled down to 76°-78° C., and to each paste is added 20 cc. of a malt extract prepared by extracting 20 grams of malt in 100 cc. of water at 60° C., for one hour, each 20 cc. of malt extract corresponding therefore to four grams of malt. These starch pastes are thoroughly mixed with the malt extract and are kept at a constant temperature of 76° to 78° C., for one hour; they are then quickly cooled to about 20° C., and tested. The result is that No. 1, prepared with distilled water, has not been saccharified, and upon addition of iodin will give a blue reaction due to the presence of unsaccharified starch; whereas No. 2, to which the calcium sulfate was added, is found to be free from starch, the same having all been converted into maltose and dextrines, the latter in relatively high proportions. These tests prove conclusively that the diastasic action is highly favored by the presence of a sufficient quantity of calcium sulfate. This property of calcium sulfate may be utilized to facilitate the process of preparing brewing mashes, one advantage being the saving of materials owing to the better liquefaction of the starch. In preparing brewing mashes according to the practice in this country the materials generally used are a mixture of malt with unmalted cereals such as corn-grits or rice, the malt constituting as a rule 60-70% of the mixture. The unmalted cereals, such as rice and grits have first to be gelatinized and are then saccharified by the malt. These raw mashes are prepared in separate vessels, and I have found that by the addition of sufficient calcium sulfate to this part of the mash, which is also known as "raw mash" or "converter mash" the process of gelatinization, liquefaction and saccharification of the starch is greatly improved. I have found that it is advantageous to add directly to the converter mash the quantity of calcium sulfate necessary or desirable for the whole brewing, securing thereby the advantage of higher efficiency of conversion due to the greater concentration of the calcium sulfate.

To be more explicit the following figures are given by way of example:—To prepare a brew of 400 barrels of beer the total amount of water for mashing and sparging is 500 barrels. Using a water free from calcium sulfate, the quantity of calcium sulfate to be added in order to give this water a favorable composition would be approximately fifty pounds. To prepare the so-called raw mash for this brewing, that is a mash of the raw materials, 90-100 barrels of water are taken. Now I have found it advantageous to add the fifty pounds of calcium sulfate, not to the 500 barrels of water necessary for the brewing, but to the 90-100 barrels used for the raw material mash; thereby I have at the end of the brewing the desirable amount of calcium sulfate present, and at the same time I have the beneficial influence of the high concentration of calcium sulfate during the preparation of the raw mash and saccharification of the malt mash. It has been found in adopting this process that the raw material mash becomes much more liquid, and that for this reason the wort runs off quicker and is more brilliant; it has also been found that the yield is increased, there being a saving of material equivalent to about one pound per barrel. In practice, the malt mash may be added to the liquefied raw mash, or following the more usual procedure the liquefied raw mash may be allowed to run into the malt mash.

The above described properties of calcium sulfate also enable me to produce worts comparatively rich in dextrines. To effect this result I add the necessary quantity of calcium sulfate to the mashes and saccharify at a temperature of approximately 74°–76° C. Without the presence of calcium sulfate in sufficient proportions the mashes would not completely saccharify at these temperatures and would show turbidity due to starch, whereas in the presence of calcium sulfate the starch will be completely converted into dextrines and maltose or non-fermentable soluble carbohydrates, the maltose in relatively small proportions, and the wort will be free from starch turbidity. This enables me to produce worts which, when fermented, will be comparatively very low in alcohol.

Instead of effecting the entire saccharification at the high temperature mentioned, a similar result may be secured by saccharifying first at moderate temperatures, say 60–65° C., and raising the temperature toward the close of the operation to approximately 74–76° C., to complete the liquefaction.

The calcium sulfate should be pure or mixed only with salts exerting a favorable action on the process. Calcium sulfate in the form of gypsum or plaster of paris has a very slow rate of solution and is highly impure, containing often up to 28% of impurities among which are often found bodies which are directly detrimental to the brewing process; these materials are therefore usually unsuitable for use.

I claim:

1. The process of making fermented beverages which consists in effecting the conversion of the raw mash in presence of dissolved calcium sulfate in excess of the proportion desired in the completed product, and thereafter diluting the calcium sulfate to a suitable degree.

2. The process of making fermented beverages which consists in effecting the conversion of the raw mash in presence of dissolved calcium sulfate in excess of the proportion desired in the completed product, and thereafter diluting the converted mash by addition of the malt mash.

3. In a process of making fermented beverages, the step of converting starch or starchy materials which consists in acting thereon with malt in presence of dissolved calcium sulfate at a temperature above 74° C.

4. In a process of making fermented beverages, the step of converting starch or starchy materials which consists in acting thereon with malt in presence of dissolved calcium sulfate at a temperature of 60–65° C., and completing the conversion at a temperature above 74° C.

In testimony whereof, I affix my signature in presence of two witnesses.

MAX WALLERSTEIN.

Witnesses:
WM. VICTOR GOLDBERG,
CHARLES T. COUENHOVEN, Jr.